(12) United States Patent
Flögel et al.

(10) Patent No.: US 6,615,665 B1
(45) Date of Patent: Sep. 9, 2003

(54) PRESSURE MEASURING DEVICE

(75) Inventors: Karl Flögel, Schopfheim (DE); Thomas Uehlin, Schopfheim (DE); Frank Hegner, Lörrach (DE); Karlheinz Banholzer, Hausen (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/583,967

(22) Filed: May 31, 2000

(30) Foreign Application Priority Data

Dec. 10, 1999 (EP) .............................. 99124600

(51) Int. Cl.[7] .............................. G01L 7/08
(52) U.S. Cl. ................ 73/715; 73/718; 361/283.1; 361/283.4
(58) Field of Search ............ 73/715, 714, 724, 73/725, 726, 706, 718, 701; 361/283.1–283.4

(56) References Cited

U.S. PATENT DOCUMENTS

| | | | |
|---|---|---|---|
| 4,665,608 A | * | 5/1987 | Okamoto et al. .............. 29/571 |
| 4,864,463 A | | 9/1989 | Shkedi et al. |
| 5,756,899 A | | 5/1998 | Ugai et al. |
| 5,877,424 A | * | 3/1999 | Hegner et al. ................ 73/724 |
| 6,267,159 B1 | * | 7/2001 | Adolf et al. ................... 141/95 |
| 6,363,790 B1 | * | 4/2002 | Flogel et al. ................. 73/708 |

FOREIGN PATENT DOCUMENTS

| | | |
|---|---|---|
| EP | 0 780 674 | 6/1997 |
| WO | WO 99/34185 | 7/1999 |

OTHER PUBLICATIONS

Waldschmidt, H., "Der Eoinfluβ von Gleichtakstörungen auf industriell eingesetzie Sensoren und Meβsysteme" ("The influence of common mode interference on industrially used sensors and measuring systems"), VDI Verlag GmbH, 1996, pp. 519–525.

* cited by examiner

Primary Examiner—William Oen
Assistant Examiner—Marissa Ferguson
(74) Attorney, Agent, or Firm—Bose McKinney & Evans LLP

(57) ABSTRACT

A pressure measuring device with a housing (21, 53) and a pressure measuring cell is provided, the pressure measuring cell being protected from interference, in particular independently of its installation position in the housing (21, 53), and comprising: a housing (21, 53), a pressure measuring cell, which has at least one pressure-sensitive measuring diaphragm (3, 35, 37), on the outer side of which a pressure (P, $P_1$, $P_2$) acts during operation, which has a transducer for converting a pressure-dependent deflection of the measuring diaphragm (3, 35, 37) into an electrical measured variable and which has free outer circumferential surfaces, which are provided with an electrically conductive coating (31, 61), and an electronic circuit (13, 49) for converting the electrical measured variable into a measuring signal.

8 Claims, 2 Drawing Sheets

PRESSURE MEASURING DEVICE

FIELD OF THE INVENTION

The invention concerns a pressure measuring device.

BACKGROUND OF THE INVENTION

In pressure measurement, a distinction is made between differential, absolute and relative pressure measuring devices. Differential pressure measuring devices serve for measuring the difference between two different pressures. In the case of absolute pressure measuring devices, a pressure to be measured is sensed absolutely, i.e. as a pressure difference with respect to a vacuum. With a relative pressure measuring device, a pressure to be measured is recorded in the form of a pressure difference with respect to a reference pressure. The reference pressure is an ambient pressure at the measuring location. In most applications, this is the atmospheric pressure at the place where the device is being used.

Pressure measuring devices usually have a housing, a pressure measuring cell enclosed in the housing for sensing the pressure and an electronic circuit. The pressure measuring cells have at least one pressure-sensitive diaphragm, on the outer side of which a pressure acts during operation. There are on the market, for example, non-metallic pressure measuring cells, in which the pressure acts directly on a measuring diaphragm. The measuring diaphragms generally consist of insulating materials, such as glass, ceramic or sapphire for example, so that an electromechanical transducer can be arranged directly on the measuring diaphragm. The electromechanical transducer converts the mechanical deflection of the measuring diaphragm into an electrical value, which is then available to the electronics for further evaluation and/or processing.

Measuring devices are powered by means of a commercially available transmitter power-supply unit, in an industrial environment usually without a ground connection, and an output signal is picked up for example by means of a load arranged at a location remote from the measuring device. Power supply lines and/or signal lines may be of a considerable length, so that there is the risk of electromagnetic interference being introduced. The introduction of so-called common mode interference, in which electromagnetic interference acts simultaneously on the connecting cables of the measuring device with respect to a common reference system, for example ground, is particularly critical. As a consequence of such common mode interference, common mode interference currents flow via the connecting cables of the measuring device, its electronic circuit and its housing to the reference system.

In the case of pressure measuring devices there is additionally the risk of interference currents flowing via the pressure measuring cell and these interference currents being superposed on the unamplified and/or unconditioned measured variables and/or measuring signals. This may lead to considerable measuring errors.

In the article 'Der Einfluß von Gleichtaktstörungen auf industriell eingesetzte Sensoren und Meßsysteme' [The influence of common mode interference on industrially used sensors and measuring systems] by H. Waldschmidt, which was published in the report 'Sensoren und Meßsysteme' [Sensors and measuring systems] issued by the VDI Verlag GmbH in 1996 to accompany the conference held in Bad Nauheim from Mar. 11 to 13, 1996, there is a description of a pressure measuring device which comprises:

a housing a pressure measuring cell which has at least one pressure-sensitive measuring diaphragm, on the outer side of which a pressure acts during operation and which has a transducer for converting a pressure-dependent deflection of the measuring diaphragm into an electrical measured variable, and an electronic circuit for converting the electrical measured variable into a measuring signal.

The pressure measuring cell is, as described at the bottom of page 523 and represented in FIG. 4, enclosed in a housing and is laterally surrounded in the housing by a shielding made of a copper foil insulated on both sides. The shielding forms as it were a housing in the housing and is connected to a reference potential, for example to an input of the pressure measuring device. An interference signal, introduced from outside the housing, consequently flows essentially via the shielding to the reference potential and the pressure measuring cell remains largely unaffected by interference.

Just such a pressure measuring device is also described in EP-A 780 674.

However, capacitive connections, the capacitances of which are usually referred to as stray capacitances, exist between the pressure measuring cell and the shielding and between the pressure measuring cell and the housing. The magnitude of the stray capacitances depends on the spatial arrangement of the pressure measuring cell, the shielding and the housing in relation to one another and on the dielectric constant of a medium located between the components mentioned. It is usually air, the dielectric constant of which depends on its moisture content at any given time. Therefore, although externally introduced interference is dissipated essentially via the shielding, a small interference current, dependent on the magnitude of the stray capacitances, also flows via the pressure measuring cell, where it may be superposed with the interference-sensitive measured variable and/or the interference-sensitive measuring signal. The measuring accuracy therefore depends among other things on the spatial arrangement of the pressure measuring cell, shielding and housing in relation to one another and on the dielectric constant of the medium at any given time. In the case of capacitive pressure measuring cells in particular, i.e. pressure measuring cells in which a capacitance changing as a function of pressure is measured, these variable stray capacitances may be superposed on the capacitance to be measured and consequently lead to a change in the measuring signal of the pressure measuring device.

The shielding represents an additional component which has to be produced and fitted. Moreover, a thin copper foil is mechanically sensitive and dimensional changes have an effect on the magnitude of the stray capacitances.

It is an object of the invention to specify a pressure measuring device with a housing and a pressure measuring cell arranged in it in which the pressure measuring cell is protected from interference, in particular independently of its installation position in the housing.

For this purpose, the invention constitutes a pressure measuring device which comprises:

a housing a pressure measuring cell which has at least one pressure-sensitive measuring diaphragm, on the outer side of which a pressure acts during operation, which has a transducer for converting a pressure-dependent deflection of the measuring diaphragm into an electrical measured variable, and which has free outer circumferential surfaces, which are provided with an electrically conductive coating, and an electronic circuit, arranged in the housing, for converting the electrical measured variable into a measuring signal.

According to one embodiment, the electrically conductive coating is a sputtered-on metallic coating.

According to one embodiment, the electrically conductive coating is a metallic lacquer, in particular a conductive carbon lacquer or a conductive silver lacquer.

According to one embodiment, the electrically conductive coating is a layer in a laminated foil.

According to one development of the invention, the pressure measuring cell is a capacitive pressure measuring cell with an electrode arranged on the measuring diaphragm and, together with the electrode, the coating forms a closed Faraday cage.

According to one embodiment, the electrode is connected via the coating to a reference potential.

According to one development of the invention, the pressure measuring cell is a capacitive differential pressure measuring cell which has two measuring diaphragm with electrodes arranged on them, and, together with the electrodes, the coating forms a closed Faraday cage.

According to one embodiment, the electrodes are connected via the coating to a reference potential.

The invention and its advantages are now explained in more detail with reference to the figures of the drawing, in which two exemplary embodiments are represented. The same elements are provided with the same reference numerals in the figures.

DETAIL DESCRIPTION OF THE DRAWINGS

Figure 1:
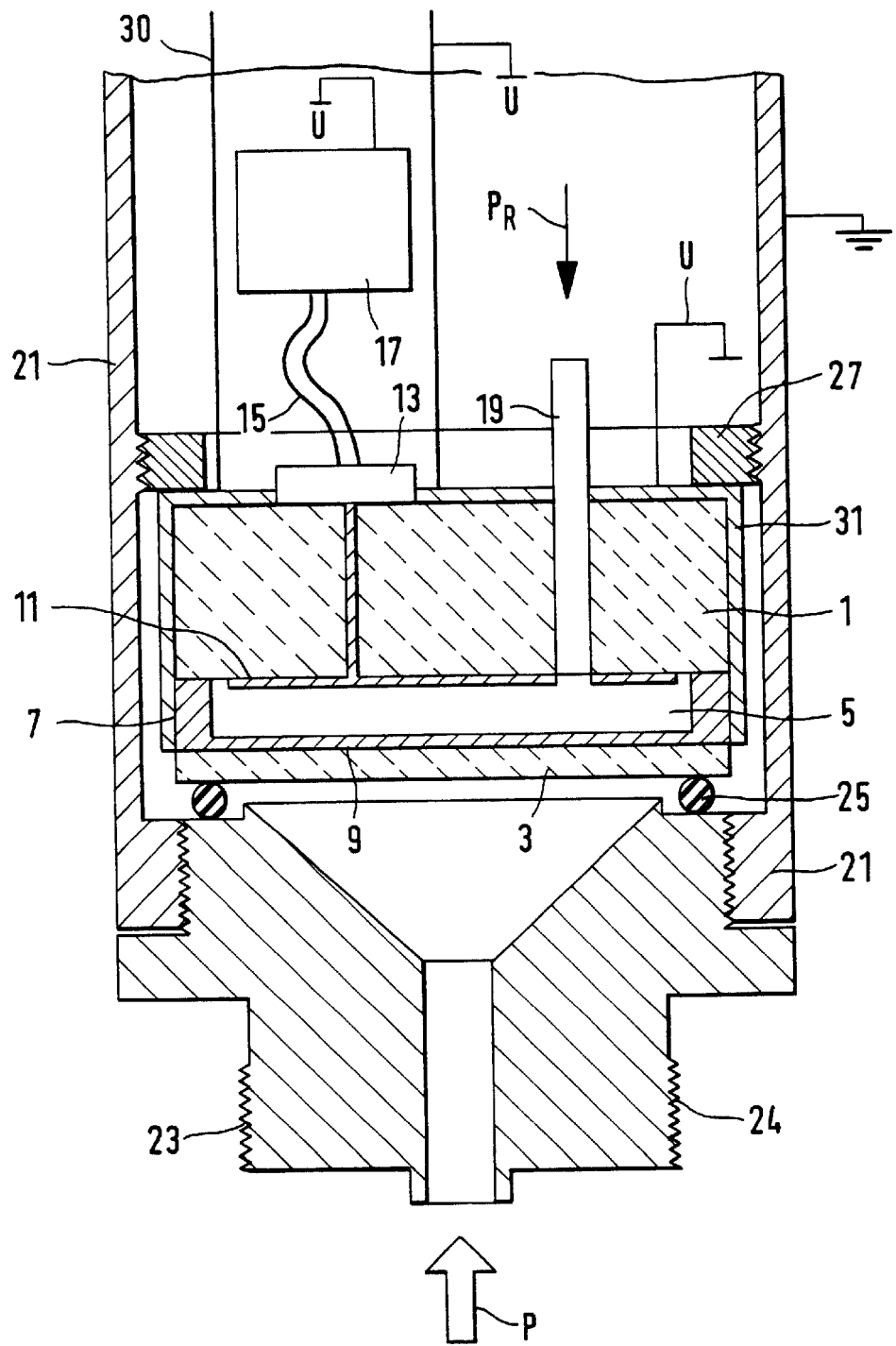
FIG. 1 shows a section through a relative pressure measuring device.

Represented in FIG. 1 is a section through a first exemplary embodiment of a pressure measuring device. The pressure measuring device is a relative pressure measuring device with a capacitive ceramic pressure measuring cell.

The pressure measuring cell has a base 1 and a measuring diaphragm 3. The base 1 consists, for example, of ceramic. The measuring diaphragm 3 may likewise consist of ceramic or, for example, of glass or of sapphire. The measuring diaphragm 3 and the base 1 are interconnected in a pressuretight and gastight manner at their edge by means of a joint 7, thereby forming a measuring chamber 5. The measuring diaphragm 3 is pressure-sensitive, i.e. a pressure P acting on it brings about a deflection of the measuring diaphragm 3 out of its position of rest.

The pressure measuring cell has a transducer for converting the pressure-dependent deflection of the measuring diaphragm 3 into an electrical measured variable.

In the exemplary embodiment of a capacitive pressure measuring cell represented, the transducer comprises an electrode 9, arranged on an inner side of the measuring diaphragm 3, and at least one counterelectrode 11, arranged on an opposite outer side of the base 1, facing the measuring diaphragm. The counterelectrode 11 of the base 1 is provided with electrical contact through the base 1 to the outer side of the latter and leads to an electronic circuit 13 arranged on the base 1. Electrode 9 and counterelectrode 11 form a capacitor and the electronic circuit 13 converts an electrical measured variable, here the changes in capacitance of the capacitor, into an electrical measuring signal, for example into a correspondingly changing electrical voltage. The measured variable is fed via connecting cables 15 to a further electronic unit 17 for further processing and/or evaluation.

During operation, a pressure P to be measured acts on an outer side of the measuring diaphragm 3. This is symbolically represented in FIG. 1 by an arrow. The pressure P brings about a pressure-dependent deflection of the measuring diaphragm 3, which is converted by the transducer into the electrical measured variable.

Instead of the capacitive transducer described, other types of transducer may also be used. Examples of these are strain gages or piezoresistive elements arranged on the measuring diaphragm and for example combined to form a Wheatstone bridge.

The base 1 has a through-hole, in which a small tube 19 is inserted. A reference pressure $P_R$, to which the pressure P to be measured is related, is fed to the measuring chamber 5 via the small tube 19. This reference pressure $P_R$ acts on the inner side of the measuring diaphragm 3, while the pressure P to be measured acts on its outer side.

The relative pressure sensor has a housing 21 and a process connection 23 connected to the latter. The process connection 23 serves the purpose of fastening the relative pressure sensor at a location where it is being used. In the exemplary embodiment shown, the process connection 23 is screwed into an internal thread, arranged in the interior of the housing 21 in a direction facing the process. At an end away from the pressure measuring cell, the process connection 23 has an external thread 24, by means of which the pressure measuring device is then Lo be fastened at a measuring location not represented in FIG. 1. Other types of fastening, for example by means of a flange connection, can likewise be used.

The process connection 23 has a central axial through-hole, which widens into a chamber before the measuring diaphragm 3. The chamber is bounded by the measuring diaphragm 3, the process connection 23 and a seal 25 clamped in between an outer pressure-insensitive annular surface of the measuring diaphragm 3 and an outer annular surface of the process connection 23, facing the measuring diaphragm 3. A pressure P prevailing at the measuring location acts via the hole and the chamber on the measuring diaphragm 3.

Screwed into the housing 21 on a side of the measuring cell facing away from the measuring diaphragm is a threaded ring 27, by which the pressure measuring cell is pressed against the seal 25. The process connection 23 is screwed against the pressure sensor in such a way that, as a result, the pressure measuring cell is clamped in between the threaded ring 27 and the process connection 23 with the seal 25 being compressed. The seal 25 in this case brings about on the one hand a strain-free clamping of the pressure measuring cell and on the other hand a sealing effect on the process side between an inner space of the housing 21 and the chamber.

The pressure measuring cell has free outer circumferential surfaces, which are provided with an electrically conductive coating 31.

The electrically conductive coating 31 is preferably a sputtered-on metallic coating. During sputtering, ion bombardment under a high vacuum of a target charged to negative potential detaches atoms from the target, which are then deposited on a substrate, here the pressure measuring cell. Gold, silver or tantalum are suitable, for example, as the target. Gold and silver offer the advantage that a coating 31 of these materials can be contacted by soldering. The contacting of a coating 31 of tantalum may be carried out for example by means of a conductive adhesive. The sputtering on of the coating 31 offers the advantage of atomic adherence of the coating 31. There is no gap or leakage between the pressure measuring cell and the coating 31. Consequently, there are in particular no channels into which moisture could penetrate. Furthermore, a plurality of pressure measuring cells can be coated simultaneously in a single sputtering process.

On account of the coating 31, there are no outward stray capacitances falsifying the measured values. The measuring accuracy of the pressure sensor is consequently independent of its installation position in the housing 21. Furthermore, with the capacitive pressure sensor described above there is the advantage that the zero point of the sensor remains unchanged and stable over long periods, for example even when there is a drastic change in the ambient atmospheric humidity or a change in the installation position of the pressure measuring cell within the housing 21.

As an alternative to the sputtered-on coating mentioned above, the electrically conductive coating 31 may be a metallic lacquer, in particular a conductive carbon lacquer or a conductive silver lacquer. A conductive carbon lacquer may be applied, for example, by rolling, screen printing or stamp printing. Conductive silver lacquer usually has a lower viscosity than conductive carbon lacquer and can therefore also be sprayed on.

The electrically conductive coating 31 may also take the form of a conductive layer in a laminated foil. The laminated foil is in this case preferably a molding which is provided with a self-adhesive film for fixing it on the pressure measuring cell.

In the exemplary embodiment shown, the pressure measuring cell is circular-disk-shaped and the coating 31 is arranged on its cylindrical outer circumferential surface and on a circular-disk-shaped outer circumferential surface of the base 1 away from the measuring diaphragm. On the latter circumferential surface, the coating 31 has a clearance for passing through the small tube 19 and for an insulated electrical through-plating of the counterelectrode 11 to the electronic circuit 13.

The electrode 9 of the pressure measuring cell extends up to an outer edge of the pressure measuring cell and is in electrically conducting connection with the coating 31 either directly or via the joint 7. The coating 31 offers the advantage here that it serves at the same time as protection for the pressure measuring cell from interference currents and as a means of electrically contacting the electrode 9.

Together with the electrode 9, the coating 31 forms a closed Faraday cage, in which the pressure measuring cell As enclosed.

If a different type of pressure measuring cell is used, in which there is no large-area electrode on the inner side, the coating 31 is to be continued on the outer side of the measuring diaphragm, so that in this case too the pressure measuring cell is surrounded on all sides by a conductive coating. Then, the coating here too forms a closed Faraday cage, in which the pressure measuring cell is enclosed.

The coating 31 is connected at an easily accessible point, in the exemplary embodiment shown this is on the side of the base I away from the measuring diaphragm, to a reference potential U represented in FIG. 1 by a potential circuit symbol. A neutral point of the circuit common to the electronic circuit 13 and the further circuit 17 is suitable as the reference potential U, as represented in FIG. 1. However, the coating 31 may also equally well be connected to an input voltage applied to the pressure measuring device. In both cases, it is ensured that interference currents flow away on the outer side of the Faraday cage to the reference system and consequently cannot be superposed on the electrical measured variable and/or the unamplified measuring signals in the interior of the pressure measuring cell.

The housing 21 is grounded in the exemplary embodiment shown. This is always required for safety reasons if the housing 21 consists of metal. In order that no electrically conducting connection exists via the clamping-in of the pressure measuring cell between the grounded housing 21 and the coating 31 connected to the reference potential U, either the coating 31 is provided on the outside with an insulation, for example a layer of plastic or a lacquer, or the clamping-in of the pressure measuring cell is performed by means of insulating materials. For example, in the exemplary embodiment represented in FIG. 1, the seal 25 and the threaded ring 27 may consist of insulating materials.

The direct application of the coating 31 can be produced very cost-effectively and no additional component is required for ensuring reliable protection from interference currents. The space requirement for the coating 31 is negligible and no fastening or securing is required for the coating 31.

Since the coating 31 is mechanically securely connected to the pressure measuring cell, the same electrical conditions always exist inside the pressure measuring cell. There is no gap or distance between the pressure measuring cell and the coating. This achieves the effect that there is no longer any capacitive connection, falsifying measured values, between the interior space of the Faraday cage formed by the coating 31 and the outer surrounding of the pressure measuring cell. The measuring accuracy of the pressure measuring cell is consequently independent of the installation and position of the pressure measuring cell in the housing 21. At the same time, the coating 31 offers protection from electromagnetic interference penetrating into the pressure measuring cell from outside. This protection is at an optimum where the measured variable and the measuring signals are most sensitive to interference signals, that is to say directly in the pressure measuring cell.

An absolute pressure measuring device according to the invention may be constructed in a completely analogous way. The only difference in comparison with the relative pressure measuring device described above is that the small tube 19 for supplying the reference pressure PR is omitted and the measuring chamber 5 is evacuated.

For protecting the electronic circuits 13, 17 from electromagnetic interference penetrating from outside, a metallic shielding 30, which is insulated on both sides and depicted only schematically in FIG. 1, may be additionally provided, as described in the prior art cited at the beginning. The metallic shielding 30 is capacitively or galvanically connected to the same reference potential U as the coating. The shielding 30 and the coating 31 preferably form a closed circumferential surface via which the externally introduced electromagnetic interference can be dissipated.

Figure 2:
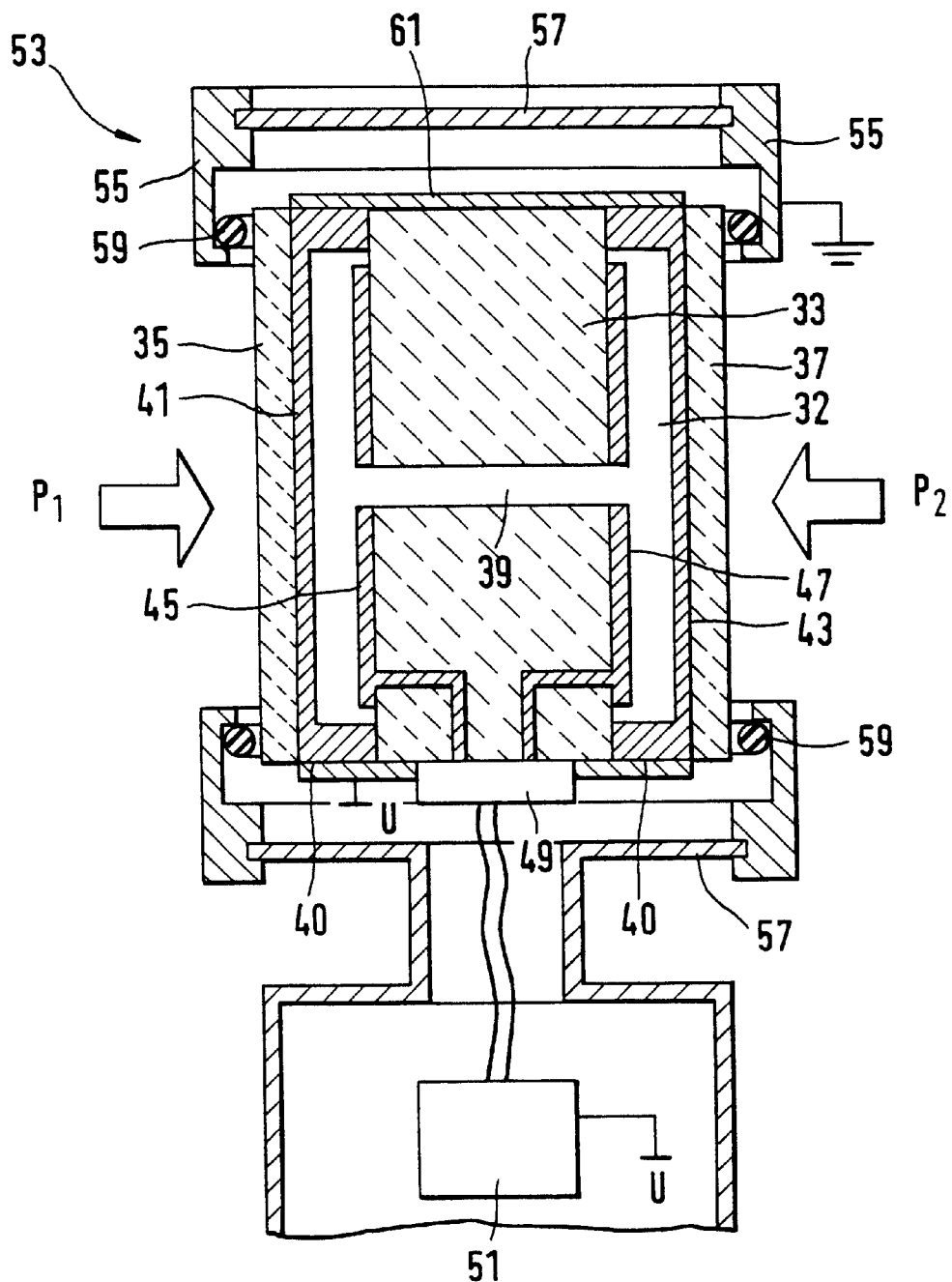
FIG. 2 shows a section through a differential pressure measuring device.

FIG. 2 shows a further exemplary embodiment of a pressure measuring device according to the invention, namely a differential pressure measuring device. Used here as the pressure measuring cell is a capacitive, cylindrical differential pressure measuring cell with a liquid-filled measuring chamber 32. It comprises a cylindrical base 33, on the one end face of which a first measuring diaphragm 35 is attached and on the second end face of which a second measuring diaphragm 37 is attached, with a hollow space being formed in each case. The measuring chamber 32 has a capillary line 39, which interconnects the two hollowspaces. Here too, the measuring diaphragms 35, 37 and the base 33 consist, for example, of ceramic and are interconnected in a pressuretight and gastight manner at their edge by means of a joint 40, thereby forming a measuring chamber. Electrodes 41 and 43 are arranged on the inner surfaces of the measuring diaphragm 35, 37 and counterelectrodes 45, .47 are arranged on the opposite outer surfaces of the base 33. One electrode 41, 43 and one opposite counterelectrode 45, 47 respectively form a measuring capacitor, the capacitance of which depends on the bending of the respective measuring diaphragm 35, 37. The counterelectrodes 45, 47 are connected, via connections led through the base 33, to an electronic circuit 49 arranged on a cylindrical circumferential surface of the base 33. Such differential pressure measuring cells are also referred to as capacitive single-chamber differential pressure measuring cells.

Applied to the first measuring diaphragm 35 is a pressure $P_1$ and applied to the second measuring diaphragm 37 is a pressure $P_2$. If, for example, the first pressure $P_1$ is greater than the second pressure $P_2$, the first diaphragm 35 is deflected in the direction of the base 33, the distance between the electrodes 41 and the counterelectrode 45 is reduced and the capacitance of this measuring capacitor increases. In a corresponding way, the second measuring diaphragm 37 is deflected outward, the distance between the electrode 43 and the counterelectrode 47 is increased and the capacitance of this measuring capacitor decreases. In the electronic circuit 49, the difference between the inverse values of the two capacitances is determined and this difference is assigned a differential pressure, i.e. a difference between the first pressure $P_1$ and the second pressure $P_2$. The electronic circuit 49 emits a corresponding measuring signal, which corresponds to the differential pressure, and makes said signal available to a further circuit 51 for further processing and/or evaluation.

By analogy with the exemplary embodiment mentioned above, here the transducer comprises two capacitors and the electrical measured variables are their capacitances.

The differential pressure measuring cell is enclosed in a housing 53, which comprises two flanges 55 and a cylindrical housing portion 57 clamped in between. The two flanges 55 respectively have a circular opening, through which the first pressure Pi acts on the first measuring diaphragm 35 and the second pressure $P_2$ acts on the second measuring diaphragm 37. The flanges 55 rest with an inner edge of the openings, and with a seal 59, for example an O-ring, interposed, on an outer pressure-insensitive edge of the measuring diaphragms 35, 37. The two flanges 55 are screwed against each other, for example by expansion bolts, not represented in FIG. 2, and thus clamp the seals 59, the pressure measuring cell and the cylindrical housing portion 57 in between them.

According to the invention, the differential pressure measuring cell has free outer circumferential surfaces, which are provided with an electrically conductive coating 61. In the exemplary embodiment shown, the differential pressure measuring cell is circular-disk-shaped and the coating 61 is applied to its cylindrical outer circumferential surface. It merely has clearances for an insulated electrical plating-through of the counterelectrodes 45, 47 to the electronic circuit 49.

The electrodes 41, 43 of the differential pressure measuring cell extend up to an outer edge of the differential pressure measuring cell and are in electrically conducting connection with the coating 61 either directly or via the joints 40. In exactly the same way as in the previous exemplary embodiment, here too the coating 61 serves at the same time as an electrical connection for the electrodes 41, 43.

Together with the electrodes 41, 43, the coating 61 forms a closed Faraday cage, in which the differential pressure measuring cell is enclosed.

The application of the coating 61, its electrical bonding and its mode of operation take place in the same way as in the exemplary embodiment represented in FIG. 1 and are therefore not described again here.

In the way represented in which the differential pressure measuring cell is clamped into the housing 53, there is no electrical connection between the coating 61 and the housing 53. Therefore, if the housing 53 is grounded, here too it is possible to dispense with insulation of the coating 61.

What is claimed is:

1. A pressure measuring device which comprises:

a housing (21, 53), a pressure measuring cell located in said housing, wherein said pressure measuring cell has a base body, said base body comprising at least one surface for receiving a diaphragm and free circumferential surfaces, said at least one surface for receiving a diaphragm and said free circumferential surfaces defining together the geometrical boundaries of said base body, said pressure measuring cell further comprising at least one pressure-sensitive measuring diaphragm (3, 35, 37) attached to said at least one diaphragm receiving surface, wherein said diaphragm is exposed to a pressure (P, $P_1$, $P_2$) during operation, said pressure measuring cell comprising a. transducer for converting a pressure-dependent deflection of the measuring diaphragm (3, 35, 37) into an electrical measured variable; and an electronic circuit (13, 49) for converting the electrical measured variable into a measuring signal; characterized in that an electrically conductive coating is applied to the free circumferential surfaces, wherein said coating serves as an electromagnetic shielding for the pressure measuring cell.

2. The pressure measuring device as claimed in claim 1, in which the electrically conductive coating (31, 61) is a sputtered-on metallic coating.

3. The pressure measuring device as claimed in claim 1, in which the electrically conductive coating (31, 61) is a metallic lacquer, in particular a conductive carbon lacquer or a conductive silver lacquer.

4. The pressure measuring device as claimed in claim 1, in which the electrically conductive coating (31, 61) is a layer in a laminated foil.

5. The pressure measuring device as claimed in claim 1, in which the pressure measuring cell is a capacitive pressure measuring cell with an electrode (9) arranged on the measuring diaphragm (3) and together with the electrode (9), the coating (31) forms a closed Faraday cage.

6. The pressure measuring device as claimed in claim 5, in which the electrode (9) is connected by means of the coating (31) to a reference potential (U).

7. The pressure measuring device as claimed in claim 1, in which the pressure measuring cell is a capacitive differential pressure measuring cell, which has two measuring diaphragms (35, 37) with electrodes (41, 43) arranged on them, and together with the electrodes (41, 43), the coating (61) forms a closed Faraday cage.

8. The pressure measuring device as claimed in claim 7, in which the electrodes (41, 43) are connected by means of the coating (61) to a reference potential (U).

* * * * *

UNITED STATES PATENT AND TRADEMARK OFFICE
CERTIFICATE OF CORRECTION

PATENT NO. : 6,615,665 B1
DATED : September 9, 2003
INVENTOR(S) : Flogel et al.

It is certified that error appears in the above-identified patent and that said Letters Patent is hereby corrected as shown below:

<u>Title page,</u>
Item [*] Notice, please correct the [*] Notice as follows:
-- Subject to any disclaimer, the term of this patent is extended or adjusted under 35 U.S.C. 154(b) by 19 days. --

Signed and Sealed this

Second Day of March, 2004

JON W. DUDAS
*Acting Director of the United States Patent and Trademark Office*